(12) United States Patent
Koga et al.

(10) Patent No.: US 10,401,849 B2
(45) Date of Patent: Sep. 3, 2019

(54) CONTROLLER FOR PERFORMING HYBRID CONTROL USING VELOCITY AND FORCE

(71) Applicant: OMRON Corporation, Kyoto-shi, Kyoto (JP)

(72) Inventors: Tatsuya Koga, Sorakugun (JP); Ryuichiro Nakanishi, Yokohama (JP)

(73) Assignee: OMRON Corporation, Kyoto-shi (JP)

( * ) Notice: Subject to any disclaimer, the term of this patent is extended or adjusted under 35 U.S.C. 154(b) by 399 days.

(21) Appl. No.: 15/364,948

(22) Filed: Nov. 30, 2016

(65) Prior Publication Data
US 2017/0153634 A1 Jun. 1, 2017

(30) Foreign Application Priority Data

Dec. 1, 2015 (JP) .................................. 2015-235248

(51) Int. Cl.
*G05B 9/02* (2006.01)
*G05B 23/02* (2006.01)
(Continued)

(52) U.S. Cl.
CPC ....... *G05B 23/0286* (2013.01); *G05B 19/416* (2013.01); *G05B 19/42* (2013.01);
(Continued)

(58) Field of Classification Search
CPC .................................................. G05B 9/02
(Continued)

(56) References Cited

U.S. PATENT DOCUMENTS 5,997,780 A * 12/1999 Ito ..................... B29C 45/766
264/328.1
6,704,160 B2 * 3/2004 Takakura ........... G11B 5/59627
360/78.06
(Continued)

FOREIGN PATENT DOCUMENTS

CN 101769818 A 7/2010
CN 102553942 A 7/2012
(Continued)

OTHER PUBLICATIONS

The Office action dated Aug. 28, 2018 in a counterpart Japanese patent application.
(Continued)

*Primary Examiner* — Suresh Suryawanshi
(74) *Attorney, Agent, or Firm* — Metrolex IP Law Group, PLLC (57) ABSTRACT

The velocity and force of a target is controlled to have a predetermined relationship, independently of changes in the velocity at which the target is driven using a velocity command value and in an external force from the target. A controller controls a control target, driven to generate a predetermined viscous force as a reaction force, by periodically outputting a command value to the control target using a target value calculated from a command pattern for driving the control target and a feedback value from the control target relative to the target value. A correction operation unit obtains a control physical quantity different from the command value, calculates a correction command value based on a relationship between an error of the obtained control physical quantity from its target value and an error of the feedback value from the target value, and outputs the correction command value to the control target.

3 Claims, 7 Drawing Sheets

(51) Int. Cl.
*G05B 19/416* (2006.01)
*G05B 19/42* (2006.01)

(52) U.S. Cl.
CPC ........... *G05B 2219/39342* (2013.01); *G05B 2219/39343* (2013.01); *G05B 2219/42016* (2013.01)

(58) Field of Classification Search
USPC ........................................................ 700/79
See application file for complete search history.

(56) References Cited

U.S. PATENT DOCUMENTS

| | | | | |
|---|---|---|---|---|
| 6,902,386 | B2* | 6/2005 | Uchiyama | B29C 45/7626 425/139 |
| 7,757,526 | B2* | 7/2010 | Iwashita | B21D 24/02 72/14.8 |
| 9,658,608 | B2* | 5/2017 | Nagaoka | G05B 19/19 |
| 2010/0274504 | A1* | 10/2010 | Takahashi | G01N 11/10 702/50 |
| 2011/0093120 | A1 | 4/2011 | Ando et al. | |
| 2016/0026170 | A1* | 1/2016 | Etou | G05B 19/416 318/603 |
| 2016/0183845 | A1 | 6/2016 | Wang et al. | |
| 2017/0153628 | A1* | 6/2017 | Koga | G05B 19/416 |
| 2017/0199510 | A1* | 7/2017 | Fujita | G05B 19/00 |

FOREIGN PATENT DOCUMENTS

| | | | |
|---|---|---|---|
| CN | 103845064 A | | 6/2014 |
| JP | 61203727 A | * | 9/1986 |
| JP | S62-174804 A | | 7/1987 |
| JP | H5-150836 A | | 6/1993 |
| JP | H8-126939 A | | 5/1996 |
| JP | 09237112 A | * | 9/1997 |
| JP | 2011-088225 A | | 5/2011 |

OTHER PUBLICATIONS

The Office action dated Sep. 3, 2018 in a counterpart Chinese patent application.

The Extended European search report dated Mar. 29, 2017 in the counterpart European patent application.

Chuanzhi et al., A Velocity-Based Impedance Control System for a Low Impact Docking Mechanism (LIDM), Sensors, Dec. 3 2014, pp. 22998-23016, vol. 14, No. 12, doi: 10.3390/s141222998, ISSN 1424-8220.

Kobayashi et al., Robust Control of Pneumatic Actuators Based on Dynamic Impedance Matching, Oct. 22, 1995, pp. 983-987, vol. 2, NY, US.

Negar Kharmandar et al., Force Impedance Control of a Robot Manipulator Using a Neuro-Fuzzy Controller, 2011 International Conference on Mechatronic Science, Electric Engineering and Computer, Aug. 19-22, 2011, pp. 559-563, Jiliin, China.

* cited by examiner

CONTROLLER FOR PERFORMING HYBRID CONTROL USING VELOCITY AND FORCE

CROSS-REFERENCES TO RELATED APPLICATIONS

This application claims priority to Japanese Patent Application No. 2015-235248 filed Dec. 1, 2015, the entire contents of which are incorporated herein by reference.

FIELD

The present invention relates to a controller for outputting a command value and controlling a control target based on the command value, and performing hybrid control combining velocity and force control. In particular, the present invention relates to a controller and a control method for controlling the velocity and the force to have a predetermined relationship between them in a system in which the viscous drag varies depending on velocity.

BACKGROUND

Impedance control is a technique for controlling positions and forces. Impedance control for machines is to control their positions and forces to control mechanical impedance (inertia, an attenuation coefficient, and stiffness) in response to an external force applied to a control target to achieve intended motions. Patent Literature 1 describes a parameter adjustment apparatus that adjusts parameters used in impedance control based on information provided from a force sensor mounted on an end effector of a robot.

CITATION LIST

Patent Literature

Patent Literature 1: Japanese Unexamined Patent Application Publication No. 2011-88225 (published on May 6, 2011)

SUMMARY

Technical Problem

An extrusion molding machine controls a molded object to be extruded with a constant force at a constant velocity. An object to be extruded receives a viscous drag F written by the formula F=DV+U, where F is the viscous drag, D is a viscous drag coefficient, V is a velocity, and U is an offset. In this manner, the viscous drag is written by the relational expression of the velocity and the force. When the viscous drag changes as the temperature or another condition changes, the control cannot be performed with a constant force at a constant velocity.

A control system used for the extrusion molding machine or other machines typically includes a servomotor, and a controller for controlling the servomotor by providing a command value to the servomotor. In this system, the controller outputs a position or velocity command value to the servomotor to control the position or the velocity of a control target, which is driven by the servomotor. The controller also outputs a torque command value to the servomotor to control the servomotor to be driven with an intended torque. As described above, this control system cannot control the velocity and the force in parallel.

One or more aspects of the present invention are directed to a controller and a control method for controlling the velocity and the force of a control target to have a predetermined relationship between them, independently of any changes in the velocity at which the control target is driven in response to a velocity command value and any changes in an external force from the control target.

Solution to Problem

In response to the above issue, a controller according to one aspect of the present invention controls a control target by periodically outputting a command value to the control target using a command target value calculated from a command pattern for driving the control target and a feedback value provided from the control target relative to the command target value. The control target is driven to generate a predetermined viscous force as a reaction force. The controller includes a correction operation unit that obtains a control physical quantity different from the command value, calculates a correction command value based on a relationship between an error of the obtained control physical quantity from a target value of the control physical quantity and an error of the feedback value from the command target value, and outputs the correction command value to the control target.

In the controller according to another aspect of the present invention, the command value is a velocity command value, and the control physical quantity is a force, and the correction operation unit calculates the correction command value using the following relational expression for velocity impedance control eliminating a spring constant: $V_c = V_{now} + \{D_{d1}(V_d - V_{now}) + M_{d1}(F_{now} - F_d)\} \Delta t$, where $V_d$ is a target velocity value, $V_{now}$ is a feedback velocity value, $F_d$ is a target force value, $F_{now}$ is a feedback force value, $D_{d1}$ is a weight coefficient, and $M_{d1}$ is a weight coefficient.

This structure appropriately controls the velocity and the force, while eliminating a spring constant showing a reaction force against a positional deviation amount.

The controller according to another aspect of the present invention further includes a storage unit that stores an upper limit and a lower limit of the correction command value. When the calculated correction command value is not within a range defined by the upper limit and the lower limit, the correction operation unit outputs the upper limit or the lower limit as the correction command value.

This structure allows calculation of a corrected velocity command value based on its maximum and minimum values.

In the controller according to another aspect of the present invention, a ratio of the weight coefficient $D_{d1}$ and the weight coefficient $M_{d1}$ is changed for every control cycle of the controller in every period for periodically outputting the command value, and a corrected velocity command value is output based on the changed ratio.

Advantageous Effects

One or more embodiments of the present invention allow control of the velocity and the force of a control target to have a predetermined relationship between them, independently of any changes in the velocity at which the control target is driven in response to a velocity command value and any changes in an external force from the control target.

DETAILED DESCRIPTION

A controller according to embodiments of the present invention will now be described with reference to the drawings. The invention is not limited to these embodiments.

EMBODIMENTS

Overall System Configuration

Figure 2:
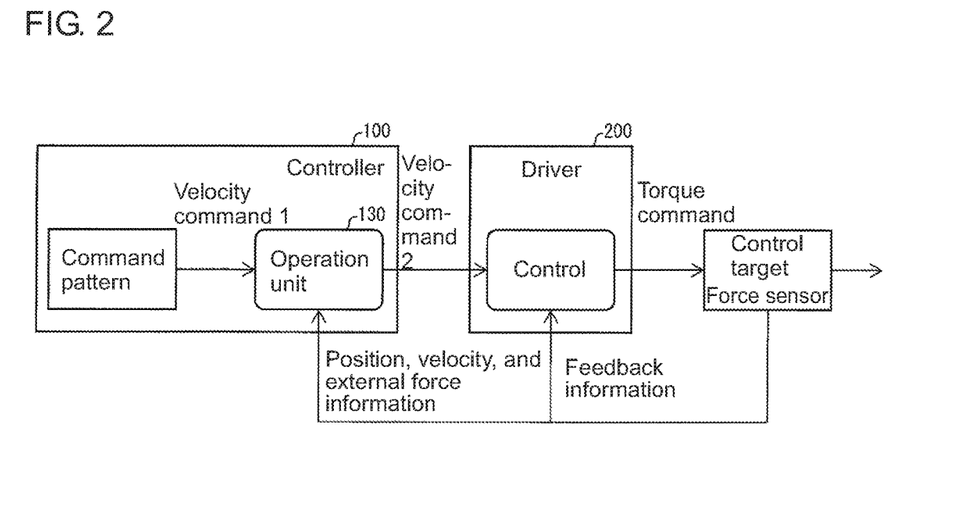
FIG. 2 is a diagram showing the overall configuration of the control system according to one embodiment.

Referring to FIG. 2, the overall configuration of the control system according to one or more embodiments of the present invention will now be described. A system 1 includes a controller 100, a driver 200, and a control target. The controller 100 periodically outputs a velocity command value to the driver 200. The driver 200 typically includes a servomotor. The driver 200 calculates a torque command value for driving a motor (not shown) using a velocity command value output from the controller 100 and a feedback value (e.g., a feedback force value) provided from the control target, and drives the motor based on the torque command value. The control target is driven by the motor. When the control target is driven, the state of the control target including its position or velocity is detected by, for example, an encoder (not shown). The state information is then fed back to the driver 200 and the controller 100. In the embodiments of the present invention, the control target is driven to have a viscous drag F as a function of the velocity. For example, $F=DV+U$, where F is the viscous drag, D is a viscous drag coefficient, V is a velocity, and U is an offset. The control target in this system 1 includes a force sensor, which detects an external force applied to the control target, and feeds the information back to the driver 200 and the controller 100.

The controller 100 is typically a programmable logic controller (PLC). The controller 100 calculates a velocity command value in every control period based on a target control profile set by the user. The controller 100 further includes an operation unit 130 (refer to FIG. 3). The operation unit 130 outputs a corrected velocity command value, which is calculated using a current velocity value and a current force value fed back in response to the calculated velocity command value (command pattern), to the driver 200. A method for calculating a corrected velocity command value using a current velocity value and a current external force value will be described later.

Figure 1:
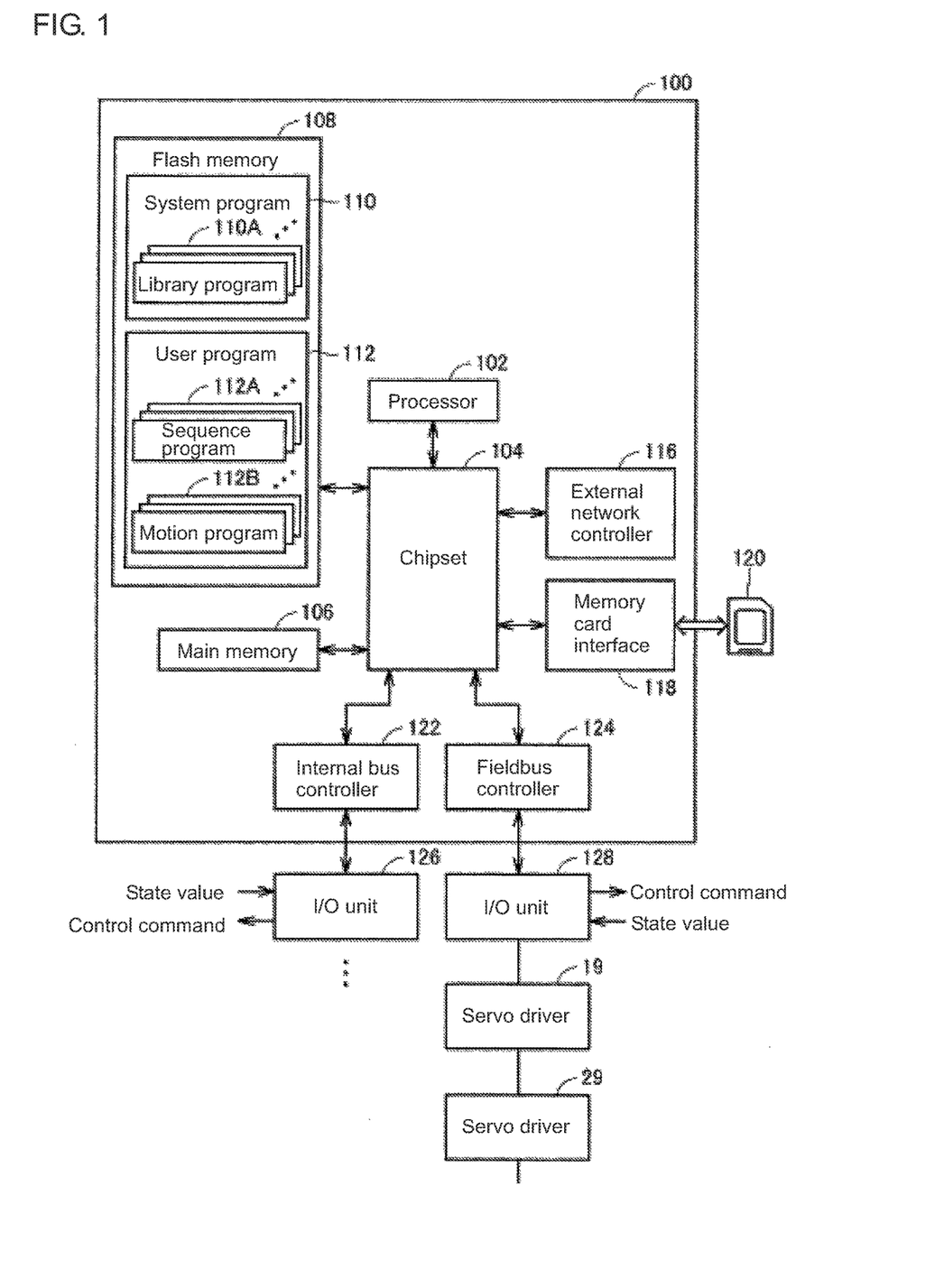
FIG. 1 is a schematic diagram showing the hardware configuration of a controller according to one embodiment.

The driver 200 typically includes servo drivers 19 and 29 (refer to FIG. 1). The driver 200 calculates a torque command value using the corrected velocity command value output from the controller 100 and the feedback velocity value, and outputs the torque command value to the motor.

Hardware Configuration of Controller 100

The hardware configuration of the controller 100 will now be described. FIG. 1 is a schematic diagram showing the hardware configuration of the controller 100 shown in FIG. 2 in one example. Referring to FIG. 1, the controller 100 controls the control target using a processor that executes preliminary installed programs. More specifically, the controller 100 includes a processor 102, such as a central processing unit (CPU) or a micro-processing unit (MPU), a chipset 104, a main memory 106 (storage unit), a flash memory 108 (storage unit), an external network controller 116, a memory card interface 118, an internal bus controller 122, and a fieldbus controller 124.

The processor 102 reads a system program 110 and a user program 112, which are stored in the flash memory 108, and expands and executes them in the main memory 106 to control the control target. The system program 110 contains instruction codes for providing the basic functions of the controller 100, such as data input and output and execution timing control. In the present embodiment, the system program 110 includes library programs 110A. The library programs 110A are general-purpose processing programs stored in a reusable manner, and are called or invoked as appropriate when the user program 112 is executed. In other words, the library programs 110A are used when the controller 100 executes a program.

The user program 112 is designed as appropriate for the control target. The user program 112 includes sequence programs 112A for executing sequence control and motion programs 112B for executing motion control. The sequence programs 112A and the motion programs 112B are executed when the library programs 110A are called as appropriate.

The chipset 104 controls these components to implement the entire processing performed by the controller 100.

The internal bus controller 122 is an interface for data communication with an I/O unit 126, which is connected to the controller 100 with an internal bus. The fieldbus controller 124 is an interface for data communication with an I/O unit 128, which is connected to the controller 100 with a fieldbus (not shown). The internal bus controller 122 and the fieldbus controller 124 each obtain a state value input into the corresponding I/O units 126 and 128, and output, as a command value, the results of operation performed by the processor 102 from the corresponding I/O units 126 and 128.

The external network controller 116 controls data communication performed via a wired or wireless network. The memory card interface 118 includes a removable memory card 120, from which data can be read and to which data is written.

Some or all of the functions provided by the controller 100 executing programs may be implemented using a dedicated hardware circuit.

Control Algorithm for Velocity and Force

The inventors have noticed one technique associated with the velocity and the force to control an error between a target velocity value and a velocity command value or an error between a target velocity value and a current velocity value to have a predetermined ratio to an error between a target force value and a current force value. The principle of controlling the velocity and the force based on the ratio of errors for the velocity and the force will be described.

The general formula for impedance control using a velocity command is given below.

$$V_c = \int \{K_d(x_d - x_{now}) + D_d(V_d - V_{now}) + (F_{now} - F_d)\}\frac{1}{M_d}dt \quad \text{Formula 1}$$

In this formula, $K_d$ is a spring constant, $D_d$ is a viscosity coefficient, $M_d$ is a mass, $x_d$ is a target position, $v_d$ is a target velocity, and $F_d$ is a target force.

Formula 1 can be transformed into the formula below.

$$V_c = \int K_{d1}(x_d - x_{now}) + D_{d1}(V_d - V_{now}) M_{d1}(F_{now} - F_d) dt \quad \text{Formula 2}$$

When the spring constant is 0 or when $K_{d1}=0$ in this formula, Formula 3 below is obtained.

$$V_c = \int D_{d1}(V_d - V_{now}) + M_{d1}(F_{now} - F_d) dt \quad \text{Formula 3}$$

Formula 3 is discretized with Euler's approximation to obtain Formula 4 below.

$$V_c = V_{now} + \{D_{d1}(V_d - V_{now}) + M_{d1}(F_{now} - F_d)\}\Delta t \quad \text{Formula 4}$$

Using Formula 4, the velocity command value is calculated using the current velocity value and the current force value. The velocity command value includes the term representing the force error value, and can be used to calculate the corrected velocity command value using the feedback force value.

In a steady state, $V_c \approx V_{now}$. The formula below is thus obtained.

The formula is $-D_{d1}(V_d - V_{now}) = M_{d1}(F_{now} - F_d)$. Thus, $D_{d1}(V_d - V_{now}) = M_{d1}(F_d - F_{now})$.

When the virtual spring constant is 0 in the general formula for impedance control, the ratio of a virtual viscosity coefficient to a virtual damper coefficient can be set to control a velocity error between a target velocity value and a current velocity value and a force error between a target force value and a current force value to have a predetermined relationship between them.

Control Method

Figure 3:
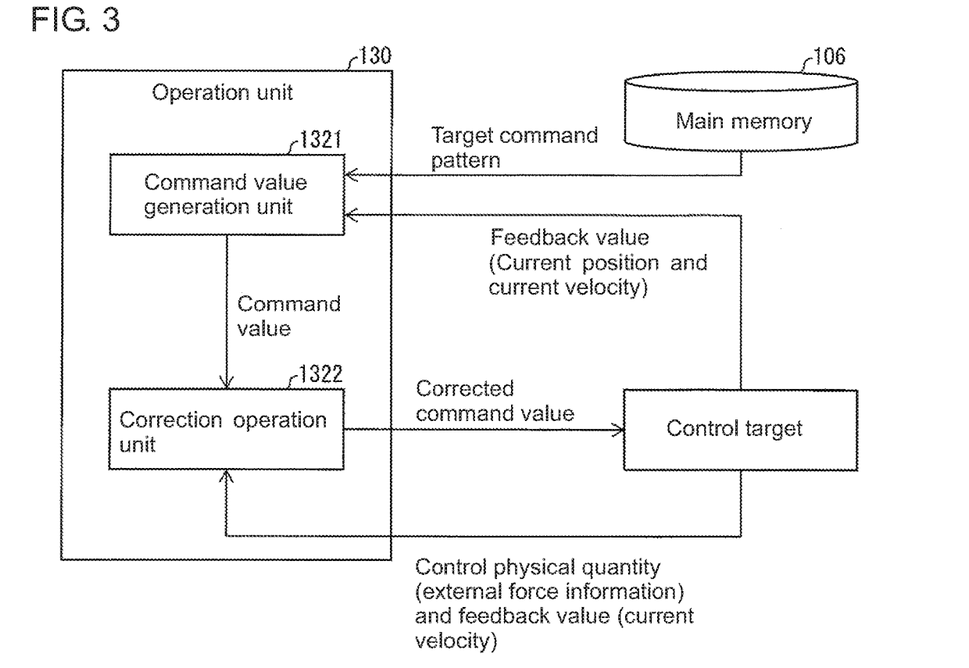
FIG. 3 is a block diagram showing the structure of an operation unit included in the controller according to one embodiment.
Figure 4:
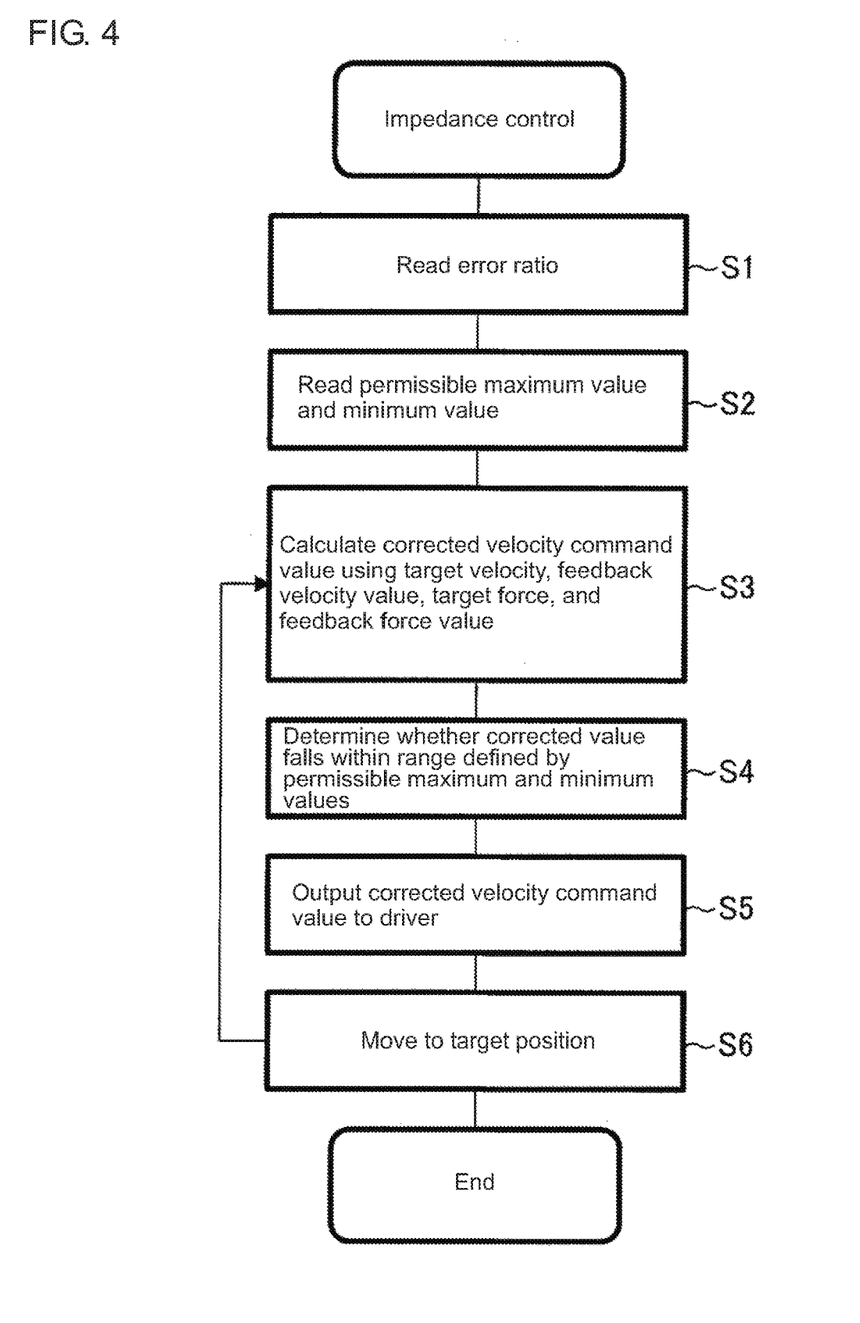
FIG. 4 is a flowchart showing the processing for calculating a velocity command value through velocity impedance control performed by the controller according to one embodiment of the present invention.

FIG. 3 shows the structure of the operation unit 130. FIG. 4 is a flowchart showing the processing for calculating a velocity command value through velocity impedance control. The operation of the operation unit 130 included in the controller 100 under velocity impedance control will now be described with reference to FIGS. 3 and 4. As shown in FIG. 3, the operation unit 130 includes a command value generation unit 1321 and a correction operation unit 1322.

In step S1, the command value generation unit 1321 included in the operation unit 130 reads a target command pattern and the ratio of the velocity error to the force error from the memory. The ratio of the velocity error to the force error may be set in advance, or may be set by the user through a user interface of, for example, a controller support apparatus.

In step S2, the command value generation unit 1321 reads a maximum value and a minimum value of a permissible velocity from the memory.

In step S3, the command value generation unit 1321 and the correction operation unit 1322 read, as feedback values, the current values of the velocity and the force of the control target that is being driven. The current values of the velocity and the force, the ratio of the velocity error to the force error read in step S1, and the target command pattern are used to calculate the velocity command value using Formula 4 above.

In step S4, the correction operation unit 1322 included in the operation unit 130 determines whether the corrected velocity command value calculated in step S3 falls within the range defined by the permissible maximum value and the permissible minimum value read in step S2. When the corrected velocity command value is within the permissible range, the correction operation unit 1322 outputs the corrected velocity command value calculated in step S3 to the servo driver 19 (step S5).

When the corrected velocity command value calculated in step S3 does not fall within the permissible range, the correction operation unit 1322 outputs the permissible maximum value or the permissible minimum value as a corrected velocity command value to the servo driver 19 (refer to FIG. 1) (step S5).

In step S6, the operation unit 130 determines whether the control target has reached a target position. When the control target has reached the target position, the operation unit 130 ends the process.

Simulation Results

Figure 5:
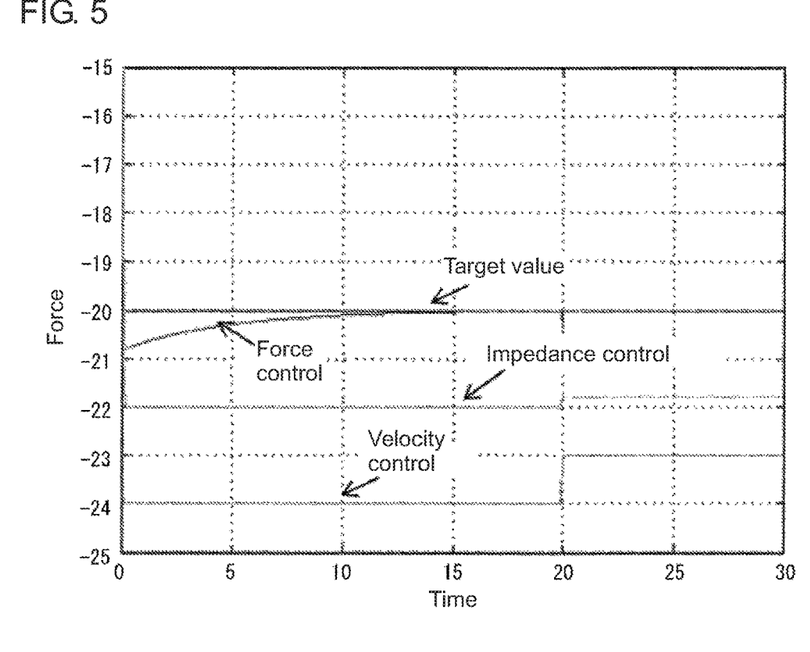
FIG. 5 is a graph showing the relationship between the time and the force when a velocity command value is corrected with velocity control, force control, and impedance control known in the art.
Figure 6:
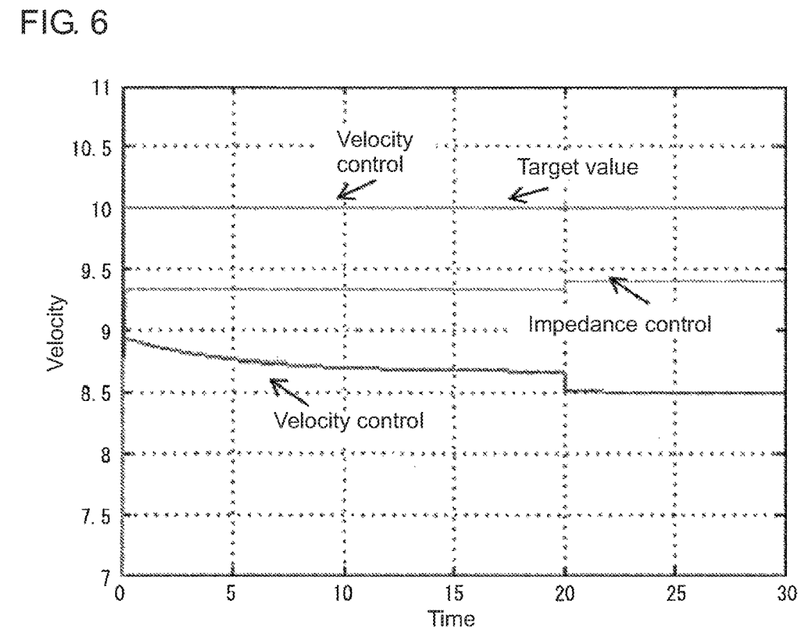
FIG. 6 is a graph showing the relationship between the time and the velocity of a control target when a velocity command value is corrected with velocity control, force control, and impedance control known in the art, with the viscous drag being varied under specific conditions.

With reference to FIGS. 5 and 6 and Table 1, the results obtained with only velocity control, with only torque control, and with error ratio control according to the embodiments of the present invention will be used to describe the advantages of the error ratio control according to the embodiments.

TABLE 1

Control errors with velocity control, torque control, and impedance control

| | Velocity control Target velocity: 10, Target force: −20 | | | | Torque control Target velocity: 10, Target force: −20 | | | | Velocity command impedance control Target velocity: 10, Target force: −20 | | | |
|---|---|---|---|---|---|---|---|---|---|---|---|---|
| Viscous drag | Velocity V | Force F | Velocity error | Force error | Velocity V | Force F | Velocity error | Force error | Velocity V | Force F | Velocity error | Force error |
| F = −3 V + 6 | 10 | −24 | 0 | 4 | 8.67 | −20 | 1.34 | 0 | 9.3 | −22 | 0.7 | 2 |
| F = −2 V − 3 | 10 | −23 | 0 | 3 | 8.5 | −20 | 1.5 | 0 | 9.4 | −21.8 | 0.6 | 1.8 |

Table 1 shows the results of errors with velocity control, torque control, and impedance control. FIG. 5 shows the relationship between the time and the force when the velocity command value is corrected with velocity control, force control, and impedance control known in the art, with the viscous drag being varied under the condition described below. FIG. 6 shows the relationship between the time and the velocity of a control target when the velocity command value is corrected with velocity control, force control, and impedance control known in the art, with the viscous drag being varied under the condition described below.

$F=-3 \times V+6 (0 <= t <= 20)$ and
$F=-2 \times V-3 (20 <= t)$  Condition: Viscous Drag F Referring to FIGS. 5 and 6, impedance control using the velocity command controls the control target with both the velocity value and the force value in accordance with the ratio of the velocity error from the target velocity to the force error from the target force value, and thus controls the control target with the velocity and the force having a predetermined relationship between them, unlike the control known in the art using either velocity control or force control in accordance with either the target velocity value or the target force value. This method can control a machine, such as the extruding machine described above, to maintain a predetermined relationship between the velocity and the force of the machine, independently of any changes in the viscous drag during control.

Figure 7:
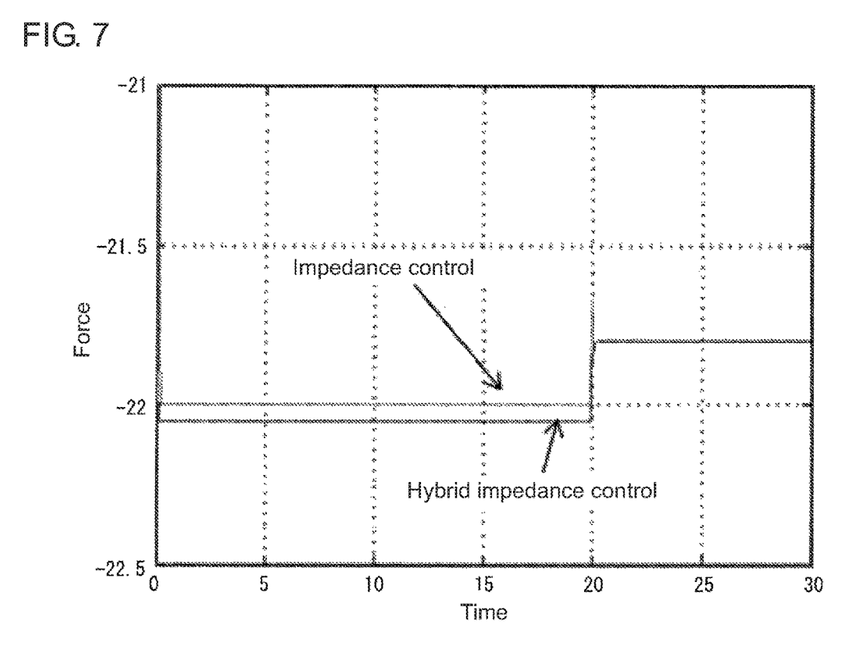
FIG. 7 is a graph showing the results of impedance control with a lower velocity limit, or showing the relationship between the force and the time for hybrid impedance control with a lower velocity limit in comparison with the relationship for impedance control with no lower velocity limit.
Figure 8:
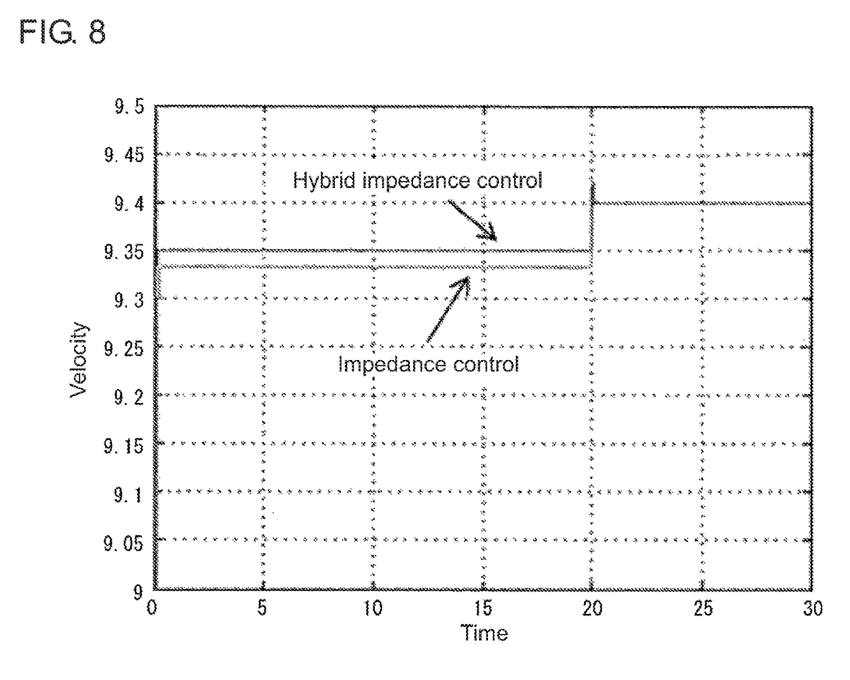
FIG. 8 is a graph showing the results of impedance control with a lower velocity limit, or showing the relationship between the velocity and the time for hybrid impedance control with a lower velocity limit in comparison with the relationship for impedance control with no lower velocity limit.

Table 2 and FIGS. 7 and 8 show the results of control using a maximum velocity value, a minimum velocity value, and a corrected velocity command value, and the results of impedance control without using a maximum velocity value, a minimum velocity value, and a corrected velocity command value. The viscous drag changes in the same manner as in the simulations shown in FIGS. 5 and 6.

with a lower velocity limit in comparison with the relationship for impedance control with no lower velocity limit.

FIG. 8 is a graph showing the results of impedance control with a lower velocity limit, or showing the relationship between the velocity and the time for hybrid impedance control with a lower velocity limit in comparison with the relationship for impedance control with no lower velocity limit.

Referring to FIGS. 7 and 8, the set lower velocity limit is output as a corrected velocity command value, indicating that the force is limited based on the corrected velocity command value. The permissible width is set using a maximum velocity value and a minimum velocity value, and a corrected velocity command value is output based on whether the corrected velocity command value resulting from the impedance control falls within the permissible width. In this manner, the control target is controlled using the corrected velocity command value resulting from the impedance control performed within the range between the set maximum velocity value and the set minimum velocity value.

Modifications of Impedance Control

Although the technique described in the above embodiment yields the corrected velocity command value with the predetermined ratio of the velocity error and the force error, the controller may intend to control an extruding machine or other machines using a maximum force value and a minimum force value in addition to the maximum velocity value and the minimum velocity value described above.

Although the corrected velocity command is calculated based on the ratio of a fixed velocity error and a fixed force error in the embodiment described above, the corrected velocity command in this modification is calculated using a

TABLE 2

Control errors in impedance control and velocity control hybrid impedance control

| | Velocity command impedance control Target velocity: 10, Target force: −20 | | | | Velocity control-velocity command hybrid impedance control Target velocity: 10, Target force: −20 | | | |
|---|---|---|---|---|---|---|---|---|
| Viscous drag | Velocity V | Force F | Velocity error | Force error | Velocity V | Force F | Velocity error | Force error |
| F = −3 V + 6 | 9.3 | −22 | 0.7 | 2 | 9.35 | −22.05 | 0.7 | 2.05 |
| F = −2 V − 3 | 9.4 | −21.8 | 0.6 | 1.8 | 9.4 | −21.8 | 0.6 | 1.8 |

Referring to Table 2, when the lower velocity limit is set at 9.35, the lower velocity limit of 9.35 is output.

FIG. 7 is a graph showing the results of impedance control with a lower velocity limit, or showing the relationship between the force and the time for hybrid impedance control different ratio of velocity and force errors in every control period in the example described below.

The formula for the velocity command impedance control is written as Formula 4 described above.

$$V_c = V_{now} + \{D_{d1}(V_d - V_{now}) + M_{d1}(F_{now} - F_d)\}\Delta t \quad \text{Formula 4}$$

In one or more embodiments of the present invention, the force error has less effect as the value of $M_{d1}$ decreases, and the velocity error has less effect as the value of $D_{d1}$ decreases.

Based on this characteristic, the weight coefficient $D_{d1}$ for the velocity is replaced with the coefficient $D_{d1}^*$, which changes sequentially under the conditions below. The coefficient $D_{d1}^*$ may be calculated using the formula below.

$$D_{d1}^* = \max\left(0, \frac{(F_{max} - F_{now})(F_{now} - F_{min})}{\frac{1}{4}(F_{max\_}F_{min})}\right) * D_{d1} \quad \text{Formula 5}$$

Under this setting in this formula, the value of $D_{d1}^*$ is very small when $F_{now} \approx F_{min}$ or $F_{now} \approx F_{max}$. The velocity error has no effect, and the force is more likely to follow its target value. In a steady state, the force will fall within the range defined by its upper limit and its lower limit.

Formula 4 is transformed using Formula 5 to obtain Formula 6 for velocity impedance control.

$$V_c = V_{now} + \left\{\max\left(0, \frac{(F_{max} - F_{now})(F_{now} - F_{min})}{\frac{1}{4}(F_{max\_}F_{min})}\right) * D_{d1_*}(V_d - V_{now}) + M_{d1}(F_{now} - F_d)\right\}\Delta t \quad \text{Formula 6}$$

In this formula, when $F_{now}$ approaches $F_{max}$, $F_{max} - F_{now} \approx 0$.

$$\frac{(F_{max} - F_{now})(F_{now} - F_{min})}{\frac{1}{4}(F_{max\_}F_{min})} \approx 0$$

The above formula is obtained.

Formula 7 for impedance control for velocity is thus obtained as follows.

$$V_c = V_{now} + \{M_{d1}(F_{now} - F_d)\}\Delta t \quad \text{Formula 7}$$

The corrected velocity command value obtained using this formula can be used to control the force to approach its target value $F_d$. The same applies to the force when $F_{now}$ approaches $F_{min}$. The force is thus also controlled to approach the target value $F_d$.

Figure 9:
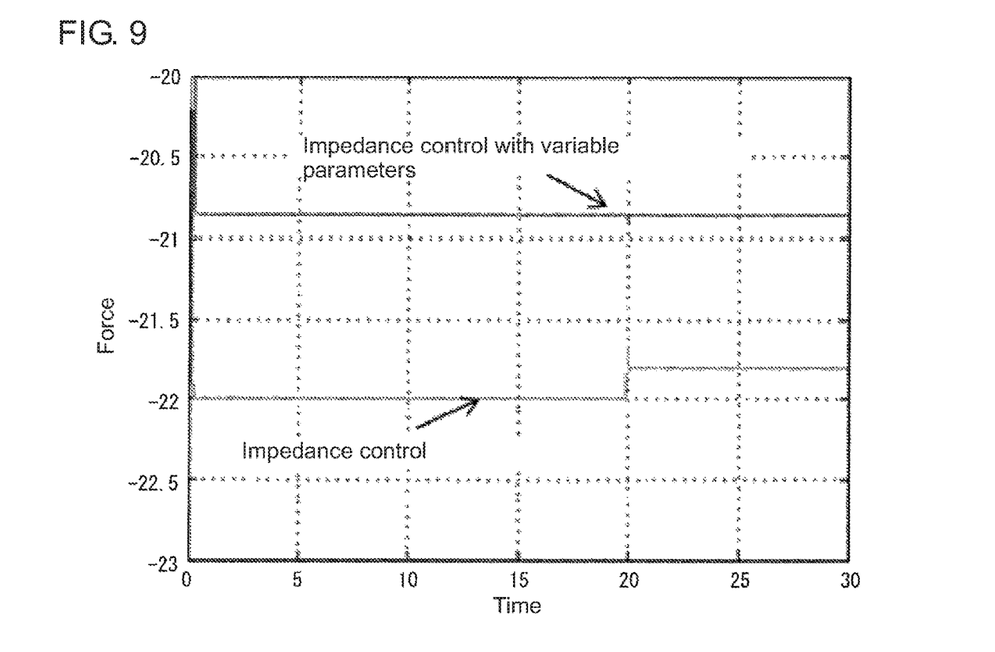
FIG. 9 is a graph showing the results of simulation of the relationship between the time and the force for impedance control using a corrected velocity command value calculated with the technique according to one embodiment, in comparison with the relationship for impedance control using a corrected velocity command value calculated using a fixed ratio of a velocity error and a force error.

FIG. 9 is a graph showing the results of simulation of the relationship between the time and the force for impedance control using a corrected velocity command value calculated with the technique according to the present embodiment, in comparison with the relationship for impedance control using a corrected velocity command value calculated using a fixed ratio of a velocity error and a force error.

Figure 10:
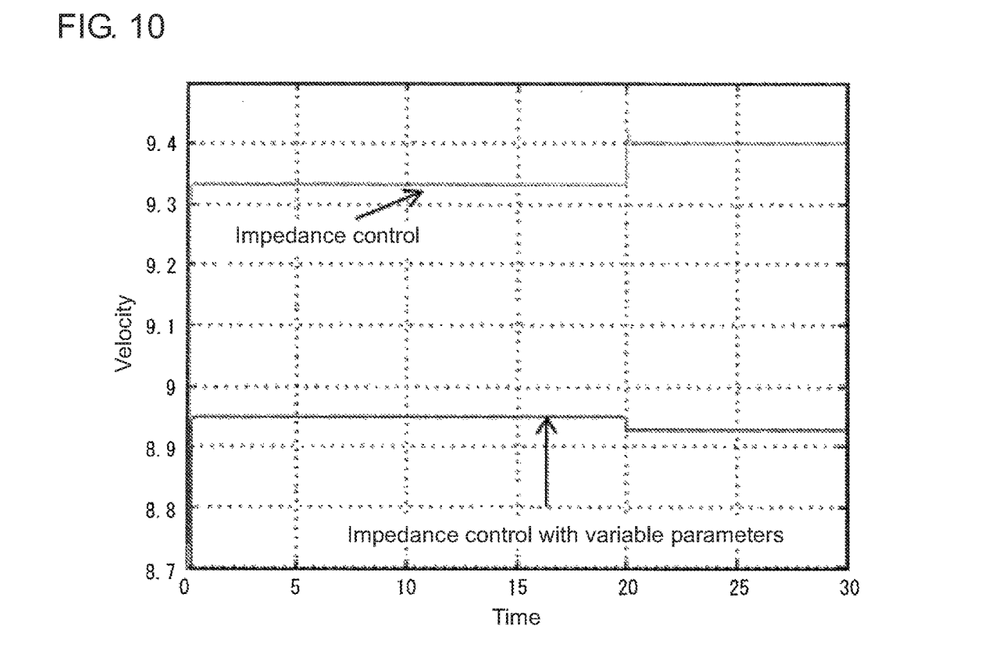
FIG. 10 is a graph showing the results of simulation of the relationship between the time and the velocity for impedance control using a corrected velocity command value calculated with the technique according to one embodiment of the present invention, in comparison with the relationship for impedance control using a corrected velocity command value calculated using a fixed ratio of a velocity error and a force error.

FIG. 10 is a graph showing the results of simulation of the relationship between the time and the velocity for impedance control using a corrected velocity command value calculated with the technique according to the present embodiment, in comparison with the relationship for impedance control using a corrected velocity command value calculated using a fixed ratio of a velocity error and a force error.

As shown in FIGS. 9 and 10, the force can be controlled within the range of the maximum value of −19 and the minimum value of −21.

This allows the corrected velocity command value to approach a value within the ranges of the maximum value and the minimum value of both the velocity and the force. The corrected velocity command value is used to control a machine to control its velocity and force between the maximum and minimum values.

Library Programs and User Program

The structure of the controller according to the present embodiment for calculating a corrected velocity command value using impedance control will now be described. In one embodiment, library programs designed for calculating a corrected velocity command value resulting from impedance control are installed preliminary in the controller. The user of the controller can generate codes to read the library programs using a controller support apparatus (not shown). Such library programs are installed preliminary by the manufacturer of the controller or by a third party, and are used to create a user program for calculating a corrected velocity command value with impedance control in a short time. The user program is executed to calculate a corrected velocity command value typically with impedance control for a control target.

Figure 11:
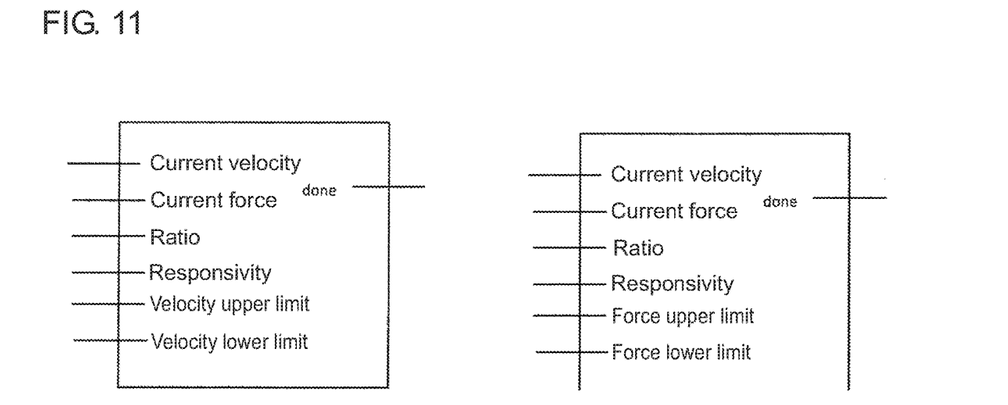
FIG. 11 is a diagram showing example library programs in one embodiment of the present invention.

FIG. 11 is a diagram showing example library programs to be executed by the controller according to the present embodiment. The programs mainly correspond to a function block for receiving a maximum velocity value and a minimum velocity value and calculating a corrected velocity command value, and a function block for receiving a maximum force value and a minimum force value and calculating a corrected velocity command value. These function blocks are partly or entirely achieved by instructions for reading, at the specified execution timing of each instruction, the corresponding library programs and executing the library programs. In other words, the library programs are program codes corresponding to the function blocks. The processor reads and executes library programs as appropriate in accordance with the execution program. The function blocks will now be described.

Referring to FIG. 11, the function blocks responsible for impedance control have, as input data, a current velocity value, a current force value, a target velocity value, a target force value, and a ratio. The function blocks further have, as input data, a maximum velocity value, a minimum velocity value, and responsivity. When the input ratio is a fixed value, the function blocks calculate, when activated, a corrected velocity command value using the current velocity value, the current force value, the target velocity value, the target force value, and the ratio that have been input. The calculated corrected velocity command value is then compared with the maximum velocity value and the minimum velocity value. When falling within the range defined by the maximum velocity value and the minimum velocity value, the corrected velocity command value is output. When failing to fall within the range, either the maximum value or the minimum value is output.

The impedance control function blocks described above and the library programs that are executed to implement these functional blocks allow creation of a program for controlling the ratio of the velocity error and the force error to have a predetermined relationship between them through impedance control without increasing the number of man-hours.

Application Examples

The controller according to the embodiments of the present invention is usable in applications for machines for controlling the velocity and the force at a predetermined ratio. For example, the controller can control a molding machine that may change its molding target from an object with high viscosity to an object with low viscosity. The controller sets the upper and lower limits of the force to be applied on the molding target to control the velocity and the force.

The controller according to the embodiments of the present invention is also usable for a winding machine. The controller sets the winding velocity within a predetermined range defined by a maximum velocity value and a minimum velocity value and the upper limit of the force to be applied on the winding target to control the winding machine at the velocity falling within the predetermined range with the force not exceeding its upper limit.

Although controllers known in the art reset control parameters associated with velocity and force commands for any changes in the processing targets or conditions, the controller according to the embodiments of the present invention eliminate such resetting of parameters.

REFERENCE SIGNS LIST 100 controller
106 main memory (storage unit)
1322 correction operation unit

The invention claimed is:

1. A controller for controlling a control target by periodically outputting a corrected command value to the control target, the control target being driven to generate a predetermined viscous force, the controller comprising a processor configured with a program to perform operations comprising:
operation as a storage unit;
operation as a command value generation unit configured to:
obtain, from the storage unit: a target velocity value and a target force value for driving the control target; a feedback velocity value from the control target; a feedback force value from the control target; and a ratio comprising a ratio of an error of the feedback velocity value to an error of the feedback force value; and
calculate a command value using the following relational expression for velocity impedance control eliminating a spring constant: $V_c = V_{now} + \{D_{d1}(V_d - V_{now}) + M_{d1}(F_{now} - F_d)\} \Delta t$, where $V_d$ comprises the target velocity value, $V_{now}$ comprises the feedback velocity value, $F_d$ comprises the target force value, $F_{now}$ comprises the feedback force value, $D_{d1}$ comprises a viscosity coefficient, and $M_{d1}$ comprises a weight coefficient; and
operation as a correction operation unit configured to:
obtain the calculated command value from the command value generation unit; and
output the calculated command value as the corrected command value to the control target.

2. The controller according to claim 1, wherein the processor is configured with the program such that:
operation as the storage unit comprises operation as the storage unit configured to store a maximum permissible value of the feedback value and a minimum permissible value of the feedback value; and
operation as the correction operation unit comprises operation as the correction operation unit that, in response to the calculated command value falling outside a range defined by the maximum permissible value of the feedback value and the minimum permissible value of the feedback value, outputs: the maximum permissible value of the feedback value or the minimum permissible value of the feedback value as the corrected command value.

3. The controller according to claim 2, wherein the processor is configured with the program such that a ratio of the viscosity coefficient $D_{d1}$ and the weight coefficient $M_{d1}$ is changed for each of a plurality of control cycles of the controller, and the corrected command value is calculated based on the changed ratio.

* * * * *